(12) United States Patent
Sikkema

(10) Patent No.: US 11,434,329 B2
(45) Date of Patent: Sep. 6, 2022

(54) POLYMERS COMPRISING SULFONATED 2,6-DIPHENYL-1,4-PHENYLENE OXIDE REPEATING UNITS

(71) Applicant: MxPolymers B.V., Wageningen (NL)

(72) Inventor: Doetze Jakob Sikkema, Wageningen (NL)

(73) Assignee: MxPolymers B.V., Wageningen (NL)

( * ) Notice: Subject to any disclaimer, the term of this patent is extended or adjusted under 35 U.S.C. 154(b) by 254 days.

(21) Appl. No.: 16/624,317

(22) PCT Filed: Jul. 5, 2018

(86) PCT No.: PCT/NL2018/050444
§ 371 (c)(1),
(2) Date: Dec. 19, 2019

(87) PCT Pub. No.: WO2019/009721
PCT Pub. Date: Jan. 10, 2019

(65) Prior Publication Data
US 2020/0165387 A1 May 28, 2020

(30) Foreign Application Priority Data
Jul. 6, 2017 (NL) ...................................... 2019192

(51) Int. Cl.
*C08G 65/48* (2006.01)
*C08J 5/22* (2006.01)
*H01M 8/10* (2016.01)
*B01D 71/52* (2006.01)
*H01M 8/1025* (2016.01)
*H01M 8/1067* (2016.01)
*H01M 8/1088* (2016.01)

(52) U.S. Cl.
CPC .............. *C08G 65/485* (2013.01); *C08J 5/22* (2013.01); *H01M 8/1025* (2013.01); *H01M 8/1067* (2013.01); *H01M 8/1088* (2013.01); *B01D 71/52* (2013.01); *C08J 2371/12* (2013.01); *H01M 2008/1095* (2013.01)

(58) Field of Classification Search
CPC ....... C08G 65/485; C08J 5/22; C08J 2371/12; H01M 8/1025; H01M 8/1067; H01M 8/1088; H01M 2008/1095; B01D 71/52
USPC ........................................................ 522/146
See application file for complete search history.

(56) References Cited

U.S. PATENT DOCUMENTS 3,484,293 A 12/1969 Hodgdon, Jr.
3,631,130 A * 12/1971 Klebe et al. ......... C08G 65/485
525/905

FOREIGN PATENT DOCUMENTS

CS 263788 B1 4/1989
JP 52130837 A * 11/1977
JP 2012116800 A * 6/2012

OTHER PUBLICATIONS

Jeong-Gi et al. "Synthesis and characterization of sulfonated bromo-poly(2,6-dimethyl-1,4-phenylene oxide)-co(2,6-diphenyl-1,4-phenylene oxide) copolymer as proton exchange membrane", Electrochimica Acta, 55, 2010, 1425-1430. (2010).*
Jeong Y G et al: "Synthesis and characterization of sulfonated bromo-poly(2,6-dimethyl-1,4-phenylene oxide)-CO-(2,6-diphenyl-1,4-phenylene oxide) copolymer as proton exchange membrane", Electrochimica Acta, Elsevier Science Publishers, Barking, GB, vol. 55, No. 4, Jan. 25, 2010 (Jan. 25, 2010), pp. 1425-1430, XP026867407, ISSN: 0013-4686 [retrieved on Jun. 11, 2009].
Hay,"Communications to the Editor", vol. 2, No. 1Jan.-Feb. 1969, p. 107-108.
Kosmala et al., "Ion-Exchange Membranes Prepared by Blending Sulfonated Poly(2,6-dimethyl-1,4-phenylene oxide) with Polybenzimidazole", Institute of Macromolecular Chemistry, Academy of Sciences of the Czech Republic, Heyrovsky Sq. 2, Prague 6, 162 06, Czech Republic, p. 1118-1127.
Li et al., "Enhancement of Proton Transport by Nanochannels in Comb-Shaped Copoly(arylene ether sulfone)s**", Angew. Chem. Int. Ed. 2011, 50, 9158-9161, 2011 Wiley-VCH Verlag GmbH & Co. KGaA, Weinheim, www.angewandte.org, DOI: 10.1002/anie.201102057.
Linkous et al., "Water Uptake and Conductivity of Cross-linked SPEEK Membranes", Hydrogen R&D Division, Florida Solar Energy Center, University of Central Florida, Cocoa, Florida 32922, USA, ECS Transactions, 16 (2) 705-710 (2008), 10.1149/1.2981906 © The Electrochemical Society.
Wang et al., "Preparation and Characterization of Sulfonated Poly (Dimethyl Phenylene Oxide)", Guangzhou Institute of Chemistry, Academia Sinica, Guangzhiou 51060.

* cited by examiner

*Primary Examiner* — Michael M. Bernshteyn
(74) *Attorney, Agent, or Firm* — N.V. Nederlandsch Octrooibureau

(57) ABSTRACT

The invention relates to polymers comprising sulfonated 2,6-diphenyl-1,4-phenylene oxide repeating units, to a method for their preparation, and to their use in a membrane electrode assembly, in a proton exchange membrane, in a fuel cell, in an electrolyser, in an electrolytic hydrogen compressor or in a flow battery. The invention further relates to a proton exchange membrane comprising said polymer and to a method for the preparation of a proton exchange membrane from said polymer. The invention also relates to the use of the polymers in ion exchange materials.

15 Claims, No Drawings

POLYMERS COMPRISING SULFONATED 2,6-DIPHENYL-1,4-PHENYLENE OXIDE REPEATING UNITS

FIELD OF THE INVENTION

The invention relates to polymers comprising sulfonated 2,6-diphenyl-1,4-phenylene oxide repeating units, to a method for their preparation, and to their use in a membrane electrode assembly, in a proton exchange membrane, in a fuel cell, in an electrolyser, in an electrolytic hydrogen compressor or in a flow battery. The invention further relates to a proton exchange membrane comprising said polymer and to a method for the preparation of a proton exchange membrane from said polymer. The invention also relates to the use of the polymers in ion exchange materials.

BACKGROUND OF THE INVENTION

Proton exchange membrane fuel cells, also known as polymer electrolyte membrane fuel cells, comprise a polymer electrolyte membrane of which the chemical, physical and mechanical properties should meet a variety of requirements. The polymer membrane must be able to conduct protons but must be an electrical insulator at the same time. Moreover, the polymer membrane must not be permeable to gas. The polymer membrane must be thermally stable and must be resistant to the reducing environment at the cathode as well as the harsh oxidative environment at the anode. Last but not least, the polymer membrane must have sufficient mechanical strength.

Over the years, different types of polymers have been developed for application in proton exchange membranes. Examples are sulfonated phenol-formaldehyde resins, sulfonated copolymers of styrene and divinylbenzene, Nafion (sulfonated tetrafluoroethylene-based fluoropolymer-copolymer), sulfonated PEEK (sulfonated polyetheretherketones) and SPPO (sulfonated poly(2,6-dimethyl-1,4-phenylene oxide)).

These (co-)polymers have in common that they are substituted with sulfonic acid groups (—$SO_3H$) and/or sulfonate salt groups (—$SO_3^-X^+$) wherein the proton is replaced with a suitable cation $X^+$. Protons are able to cross the membrane prepared from these polymers because they can 'hop' from one sulfonic acid or sulfonate group to another sulfonic acid or sulfonate group. Proton conductivity therefore depends, among other things, on the degree of substitution (DS) or the equivalent weight (EW) of the polymer with sulfonic acid and/or sulfonate groups. The equivalent weight (EW) is defined as the number of grams of dry sulfonated polymer per mol of sulfonic acid/sulfonate groups. Hence, a higher DS-value of the polymer corresponds to a lower EW-value.

Nafion typically has an equivalent weight EW of between 800 and 1800 g/(mol $SO_3H$). Nafion is a rather expensive material and its production involves environmental issues. SPEEK typically has an equivalent weight EW of between 800 and 1800 g/(mol $SO_3H$). SPEEK with low EW-values is known to have considerable water uptake. In this respect, reference is made to C. A. Linkous, et al., Water uptake and conductivity of cross-linked SPEEK membranes, *ECS Transactions*, 16(2), 2008, pp 705-710.

High water uptake leads to swelling of the polymer membrane with a corresponding reduced mechanical stability which makes the polymer membrane unsuitable for application in fuel cells.

B. Kosmala and J. Schauer, *Journal of Applied Polymer Science*, 85(5), 2002, pp 1118-1127, disclose ion exchange membranes for use in fuel cells, said membranes comprising sulfonated poly(2,6-dimethyl-1,4-phenylene oxide) (SPPO), or blends of sulfonated poly(2,6-dimethyl-1,4-phenylene oxide) and polybenzimidazole. The chemical structure of poly(2,6-dimethyl-1,4-phenylene oxide) is given by Formula (I), wherein R=methyl and wherein n is an integer of which the value depends on the molecular weight of the polymer chain:

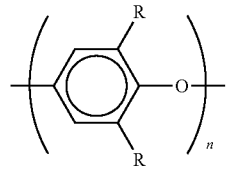

Formula (I)

The sulfonated poly(2,6-dimethyl-1,4-phenylene oxide)s disclosed in B. Kosmala and J. Schauer are produced by reacting poly(2,6-dimethyl-1,4-phenylene oxide) with chlorosulfonic acid in chloroform or in 1,2-dichloroethane causing the SPPO to precipitate from the reaction mixture. SPPO with degrees of sulfonation of 0.254 and 0.424 were obtained. These degrees of sulfonation correspond to equivalent weights EW of 552 g/(mol $SO_3H$) and 363 g/(mol $SO_3H$), respectively. It is described that the performance of the membranes in the fuel cells increased with an increase in the concentration of SPPO/sulfonic acid groups in the blend, but that membranes formed with highly sulfonated SPPO alone or predominantly consisting of SPPO swelled excessively in water, did not give reproducible results and showed inferior results.

U.S. Pat. No. 3,631,130 discloses a polymer comprising sulfonated 2,6-diphenyl-1,4-phenylene oxide repeating units. The polymer is obtained by dissolving the polymer in a first solvent, adding chlorosulfonic acid in a second solvent, performing the sulfonation with the chlorosulfonic acid, recovering the polymer in a third solvent and precipitating the polymer, thereby retrieving the sulfonated polymer.

Further examples of sulfonation of poly(2,6-dimethyl-1,4-phenylene oxide) are disclosed in Czech patent application CS263788A1 and in C. Wang, *Gaofenzi Xuebao*, 4, 1995, pp 488-493.

N. Li et al., Enhancement of proton transport by nanochannels in comb-shaped copoly(arylene ether sulfone)s, *Angew. Chem. Int. Ed.*, 50, 2011, pp 9158-9161, disclose comb-shaped polymers for use in proton exchange membranes and a process for their preparation, said comb-shaped polymers consisting of a backbone polymer with sulfonated oligomers having on average between 6.2 and 12.3 repeating units of 2,6-diphenyl-1,4-phenylene oxide grafted thereon. The chemical structure of the 2,6-diphenyl-1,4-phenylene oxide oligomers is given by Formula (I), wherein R=phenyl.

The equivalent weight of the comb-shaped polymers is higher than 580 g/(mol $SO_3H$). It is disclosed that the polymers have a higher water uptake than Nafion 112 and that they exhibit strong anisotropic dimensional swelling behavior.

Accordingly, there is a need for polymers with improved properties that can be applied in proton exchange membranes. It is therefore an object of the invention to provide polymers with at least one of an improved thermal stability, an increased proton conductivity, a sufficient mechanical stability and a good processability. It is a further object of the invention to provide a process for the preparation of said polymers that can be applied at large scale.

SUMMARY OF THE INVENTION

Poly(2,6-diphenyl-1,4-phenylene oxide), often abbreviated as PPPO or P₃O, with CAS number 24938-68-9 P, has a low affinity for water and a rather low polarity. It can be dissolved in various non-polar solvents such as dichloromethane and chloroform. During sulfonation of poly(2,6-diphenyl-1,4-phenylene oxide), highly polar groups are introduced onto the poly(2,6-diphenyl-1,4-phenylene oxide) polymer backbone. This means that the solubility of the resulting polymer in solvents such as dichloromethane and chloroform decreases during sulfonation very quickly, resulting in precipitation of the sulfonated polymer from the solvent. As a consequence, the preparation of sulfonated poly(2,6-diphenyl-1,4-phenylene oxide) with high degrees of sulfonation is difficult. Yet, high degrees of sulfonation and limited aqueous swellability are required to provide proton exchange membranes with sufficient proton conductivity and sufficient mechanical strength.

The present inventor has found that the above objects can be met by sulfonating polymers comprising 2,6-diphenyl-1,4-phenylene oxide repeating units in a process wherein different solvents and mixtures of different solvents are applied. In particular, the present inventor has established that polymers with high degree of sulfonation (high proton conductivity) and proton exchange membranes comprising these polymers having sufficient mechanical strength (limited aqueous swellability) can be produced when the sulfonation reaction of the polymers comprising 2,6-diphenyl-1,4-phenylene oxide repeating units is applied in a mixture of a (a) good solvent for the polymers comprising the 2,6-diphenyl-1,4-phenylene oxide repeating units and (b) a good solvent for the resulting more polar sulfonated polymer.

The present invention thus provides a polymer comprising sulfonated 2,6-diphenyl-1,4-phenylene oxide repeating units in accordance with Formula (Ia):

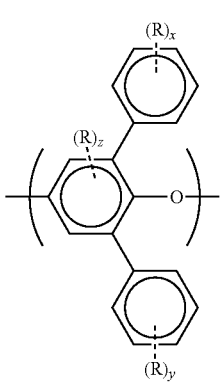

Formula (Ia)

wherein group R represents sulfonic acid (—SO₃H), sulfonate salt (—SO₃⁻X⁺), wherein X⁺ is a cation, or combinations thereof; and
wherein x, y and z are integer values, independently chosen from 0, 1, and 2; and
wherein the equivalent weight, defined as the number of grams of dry sulfonated polymer per mol of group R, is between 215 and 405 g/(mol R).

In a second aspect, the invention relates to a process for the preparation of the polymer comprising sulfonated 2,6-diphenyl-1,4-phenylene oxide repeating units as defined hereinbefore, said process comprises the steps of:
(i) providing a polymer comprising 2,6-diphenyl-1,4-phenylene oxide repeating units in accordance with Formula (II):

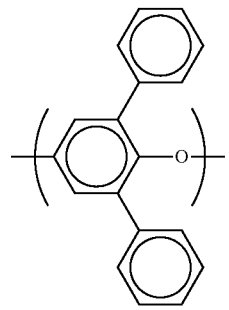

Formula (II)

(ii) dissolving the polymer of step (i) in a first solvent;
(iii) adding a second solvent to the solution of step (ii), said second solvent being miscible with the first solvent when used in an amount of between 10 to 60% with respect to the volume of the first solvent and having a higher polarity than the first solvent;
(iv) subjecting the dissolved polymer of step (iii) to sulfonation by adding oleum;
(v) adding a third solvent to the solution of step (iv) causing precipitation of the polymer comprising sulfonated 2,6-diphenyl-1,4-phenylene oxide repeating units; and
(vi) separating the polymer comprising sulfonated 2,6-diphenyl-1,4-phenylene oxide repeating units from the reaction mixture of step (v).

In a third aspect, the invention relates to a proton exchange membrane comprising the polymer comprising sulfonated 2,6-diphenyl-1,4-phenylene oxide repeating units as defined hereinbefore or the polymer comprising sulfonated 2,6-diphenyl-1,4-phenylene oxide repeating units obtainable by the process as defined hereinbefore.

In a fourth aspect, the invention relates to a process for the preparation of a proton exchange membrane comprising the steps of:
(a) providing the polymer comprising sulfonated 2,6-diphenyl-1,4-phenylene oxide repeating units as defined hereinbefore or the polymer comprising sulfonated 2,6-diphenyl-1,4-phenylene oxide repeating units obtainable by the process as defined hereinbefore;
(b) dissolving the polymer of step (a) in an alcoholic solvent having a boiling point at 1 atm of between 60 and 120° C.;
(c) adding a plasticiser having a boiling point of at least 220° C. at 1 atm and optionally a chemical cross-linker to the solution of step (b);
(d) preparing a film layer of the solution of step (c);
(e) evaporating the alcoholic solvent from the film layer of step (d) to obtain a dried film layer; and
(f) chemically cross-linking the dried film layer of step (e) at a temperature between 50 and 250° C. to obtain the proton exchange membrane.

In a fifth aspect, the invention relates to the use of the polymer comprising sulfonated 2,6-diphenyl-1,4-phenylene oxide repeating units as defined hereinbefore or the polymer comprising sulfonated 2,6-diphenyl-1,4-phenylene oxide repeating units obtainable by the process as defined hereinbefore in a membrane electrode assembly, in a proton exchange membrane, in a fuel cell, in an electrolytic hydrogen compressor, in an electrolyser, or in a flow battery.

In a sixth aspect, the invention relates to the use of the polymers as defined hereinbefore in ion exchange materials.

Definitions

The term 'polymer' as used herein encompasses homopolymers, i.e. polymers that comprise only a single type of monomer or repeating unit, and copolymers, i.e. polymers that comprise two or more types of monomers or repeating units. Copolymers that are encompassed by the term polymer can be random copolymers, block-copolymers and branched or grafted polymers.

The term 'degree of sulfonation', abbreviated as 'DS', as used herein, is defined as the number of moles of sulfonic acid groups per repeating unit in the polymer chain. In case the polymer is a co-polymer, the term 'degree of sulfonation' is less well-defined because different repeating units may have different degrees of sulfonation. In those cases, it is better to use the term 'equivalent weight'.

The term 'equivalent weight', abbreviated as EW, as used herein, is defined as the number of grams of dry sulfonated polymer per mol of sulfonic acid groups.

The term 'polymer electrolyte membrane' in the context of the present invention is considered to be synonymous to 'proton exchange membrane'.

DETAILED DESCRIPTION

In a first aspect of the invention, a polymer comprising sulfonated 2,6-diphenyl-1,4-phenylene oxide repeating units in accordance with Formula (Ia) is provided:

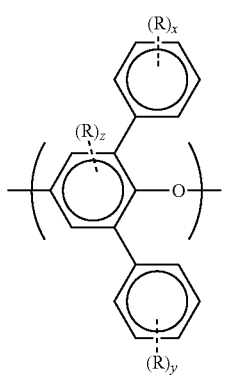

Formula (Ia)

wherein group R represents sulfonic acid (—SO$_3$H), or sulfonate salt (—SO$_3^-$X$^+$), wherein X$^+$ is a cation, or combinations thereof;
wherein x, y and z are integer values, independently chosen from 0, 1 and 2; and
wherein the equivalent weight, defined as the number of grams of dry sulfonated polymer per mol of group R, is between 215 and 405 g/(mol R).

Examples of cations X$^+$ that can be used in sulfonate salts (—SO$_3^-$X$^+$) are ammonium (NH$_4^+$) and alkali metal cations such as Na$^+$, K$^+$ and Li$^+$.

The integers x, y and z are independently chosen from 0, 1 and 2. This means that both phenyl substituents on the benzene ring in the polymer backbone and the backbone phenylene ring can be independently substituted with 0 to 2 groups R. It is to be understood that the polymer comprises multiple 2,6-diphenyl-1,4-phenylene oxide repeating units and that both phenyl substituents on the benzene ring in the polymer backbone of every 2,6-diphenyl-1,4-phenylene oxide repeating unit, as well as the backbone phenylene ring of every 2,6-diphenyl-1,4-phenylene oxide repeating unit can be independently substituted with 0 to 2 groups R.

In a preferred embodiment, the equivalent weight, defined as the number of grams of dry sulfonated polymer per mol of group R, is between 225 and 330 g/(mol R), more preferably between 240 and 270 g/(mol R).

In a preferred embodiment, the polymer comprising 2,6-diphenyl-1,4-phenylene oxide repeating units, before sulfonation or without sulfonic acid/sulfonate groups, has an average molecular weight M$_v$, as measured using viscosimetry in accordance with P. J. Akers, G. Allen and M. J. Bethell, *Polymer*, 9, 1968, page 575, between 10.000 and 500.000 g/mol, more preferably between 25.000 and 400.000 g/mol, even more preferably between 40.000 and 350.000 g/mol.

In an embodiment, the polymer comprising 2,6-diphenyl-1,4-phenylene oxide repeating units, before sulfonation or without sulfonic acid/sulfonate groups, has an average molecular weight M$_v$ of between 10.000 and 500.000 g/mol, more preferably between 25.000 and 400.000 g/mol, even more preferably between 40.000 and 350.000 g/mol.

In another preferred embodiment, the polymer is a random copolymer, block-copolymer, or a grafted or branched polymer comprising in addition to the sulfonated 2,6-diphenyl-1,4-phenylene oxide repeating units in accordance with Formula (Ia), further repeating units chosen from the group consisting of other types of 2,6-disubstituted-1,4-phenylene oxides, and (di)oxyterminated etherketones, ethersulfones, phenylenes and mixtures thereof, and wherein the ratio of the number of repeating units in accordance with Formula (Ia) to the further repeating units is between 99:1 and 20:80.

In a very preferred embodiment, the polymer as defined hereinbefore is a homopolymer consisting of the repeating units in accordance with Formula (Ia), i.e. the polymer is sulfonated poly(2,6-diphenyl-1,4-phenylene oxide).

In a second aspect, the invention relates to a process for the preparation of a polymer comprising sulfonated 2,6-diphenyl-1,4-phenylene oxide repeating units as defined hereinbefore, said process comprises the steps of:
(i) providing a polymer comprising 2,6-diphenyl-1,4-phenylene oxide repeating units in accordance with Formula (II):

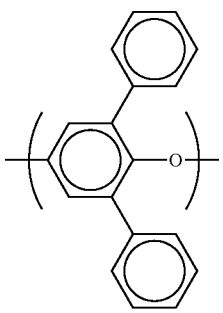

Formula (II)

(ii) dissolving the polymer of step (i) in a first solvent;
(iii) adding a second solvent to the solution of step (ii), said second solvent being miscible with the first solvent when used in an amount of between 10 to 60% with respect to the volume of the first solvent and having a higher polarity than the first solvent;

(iv) subjecting the dissolved polymer of step (iii) to sulfonation by adding oleum;

(v) adding a third solvent to the solution of step (iv) causing precipitation of the polymer comprising sulfonated 2,6-diphenyl-1,4-phenylene oxide repeating units; and (vi) separating the polymer comprising sulfonated 2,6-diphenyl-1,4-phenylene oxide repeating units from the reaction mixture of step (v).

In preferred embodiment, the polymer prepared in the process is the polymer comprising sulfonated 2,6-diphenyl-1,4-phenylene oxide repeating units as defined in the preferred embodiments described hereinbefore.

The preparation of the poly(2,6-diphenyl-1,4-phenylene oxide) backbone of this polymer by oxidative polymerization of monomer 2,6-diphenylphenol under a flow of oxygen using equimolar amounts of copper(I)chloride or copper(I) bromide as catalyst and TMEDA as ligand for the catalyst is for example disclosed in A. S. Hay, *Macromolecules*, 2(1), 1969, *'Communications to the Editor'*, pp 107-108, which is herein incorporated by reference.

In a preferred embodiment, the polymer comprising 2,6-diphenyl-1,4-phenylene oxide repeating units in accordance with Formula (II) has an average molecular weight $M_v$, as measured using viscosimetry in accordance with P. J. Akers, G. Allen and M. J. Bethell, *Polymer*, 9, (1968), page 575, between 10.000 and 500.000 g/mol, more preferably between 25.000 and 400.000 g/mol, even more preferably between 40.000 and 350.000 g/mol.

In an embodiment, the polymer comprising 2,6-diphenyl-1,4-phenylene oxide repeating units in accordance with Formula (II) has an average molecular weight $M_v$ of between 10.000 and 500.000 g/mol, more preferably between 25.000 and 400.000 g/mol, even more preferably between 40.000 and 350.000 g/mol.

The first solvent should be able to dissolve the polymer comprising 2,6-diphenyl-1,4-phenylene oxide repeating units in accordance with Formula (II). Preferred examples of the first solvent are 1,2-dichlorobenzene, dichloromethane, chloroform, methylchloroform, ethylene chloride and mixtures thereof.

In a very preferred embodiment, the first solvent has a boiling point at 1 atm of between 30 and 120° C. such that it can be easily removed from the reaction mixture obtained in step (iv) by evaporation and is not subject to sulfonation when oleum is added in step (iv). Hence, in a very preferred embodiment, the first solvent is chosen from the group consisting of dichloromethane, chloroform, methylchloroform and ethylene chloride. Most preferably, the first solvent is dichloromethane.

The second solvent is miscible with the first solvent and has a higher polarity such that polymer comprising 2,6-diphenyl-1,4-phenylene oxide repeating units that has been sulfonated to a certain extent remains in solution. Preferred examples of the second solvent are sulfolane, nitrobenzene and ethyl-propylsulfone.

If the first solvent has a boiling point at 1 atm of between 30 and 120° C. such that it can be easily removed from the reaction mixture obtained in step (iv), the second solvent preferably has a boiling point of between 125 and 350° C. at 1 atm such that it is not evaporated together with the first solvent. Preferred examples of second solvents having a boiling point of between 125 and 350° C. at 1 atm are sulfolane, nitrobenzene and ethyl-propylsulfone.

The third solvent should lower the solubility of the polymer comprising 2,6-diphenyl-1,4-phenylene oxide repeating units that has been sulfonated. Preferred examples of the third solvent are diethyl ether, acetonitrile and ethyl acetate, most preferably diethyl ether.

In a very preferred embodiment, the first solvent is chosen from the group consisting of dichloromethane and 1,2-dichloroethane, the second solvent is chosen from the group consisting of sulfolane and nitrobenzene and the third solvent is diethyl ether.

In another very preferred embodiment, the first solvent is dichloromethane, the second solvent is sulfolane and the third solvent is diethyl ether.

In still another very preferred embodiment, the first solvent is dichloromethane, the second solvent is sulfolane and the third solvent is acetonitrile.

The second solvent is preferably used in an amount of 10 to 60 vol. % with respect to the first solvent. The third solvent is preferably used in a large excess relative to the mixture that is to be combined with the third solvent, preferably 5-50 fold by volume, more preferably 7-20 fold by volume.

If the first solvent having a boiling point at 1 atm of between 30 and 120° C. is removed from the reaction mixture obtained in step (iv) by evaporation, the viscous mass obtained after removal of the first solvent is preferably dissolved in a $C_1$-$C_4$ alcohol before applying step (v). Preferably, the $C_1$-$C_4$ alcohol is chosen from the group consisting of methanol, ethanol, iso-propanol, or combinations thereof.

Hence, in a preferred embodiment, the process for the preparation of the polymer comprising sulfonated 2,6-diphenyl-1,4-phenylene oxide repeating units as defined hereinbefore comprises the steps of:

(i) providing a polymer comprising 2,6-diphenyl-1,4-phenylene oxide repeating units in accordance with Formula (II):

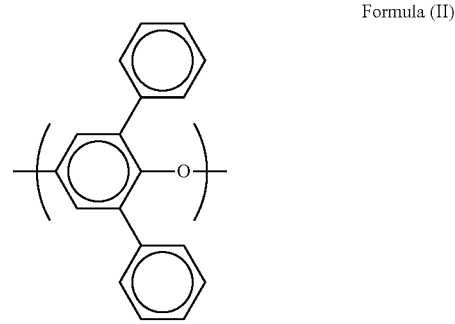

Formula (II)

(ii) dissolving the polymer of step (i) in a first solvent having a boiling point at 1 atm of between 30 and 120° C. as defined hereinbefore;

(iii) adding a second solvent to the solution of step (ii), said second solvent being miscible with the first solvent when used in an amount of between 10 to 60% with respect to the volume of the first solvent, having a higher polarity than the first solvent and having a boiling point of between 125 and 350° C. at 1 atm as defined hereinbefore;

(iv) subjecting the dissolved polymer of step (iii) to sulfonation by adding oleum, removing the first solvent from the reaction mixture through evaporation to obtain a viscous mass, and dissolving the viscous mass in a $C_1$-$C_4$ alcohol as defined hereinbefore;

(v) adding a third solvent to the solution of step (iv) causing precipitation of the polymer comprising sulfonated 2,6-diphenyl-1,4-phenylene oxide repeating units; and
(vi) separating the polymer comprising sulfonated 2,6-diphenyl-1,4-phenylene oxide repeating units from the reaction mixture of step (v).

In a third aspect, the invention relates to a proton exchange membrane comprising the polymer comprising sulfonated 2,6-diphenyl-1,4-phenylene oxide repeating units as defined hereinbefore or the polymer comprising sulfonated 2,6-diphenyl-1,4-phenylene oxide repeating units obtainable by the process as defined hereinbefore.

In a fourth aspect, the invention relates to a process for the preparation of a proton exchange membrane comprising the steps of:
(a) providing the polymer comprising sulfonated 2,6-diphenyl-1,4-phenylene oxide repeating units as defined hereinbefore or the polymer comprising sulfonated 2,6-diphenyl-1,4-phenylene oxide repeating units obtainable by the process as defined hereinbefore;
(b) dissolving the polymer of step (a) in an alcoholic solvent having a boiling point at 1 atm of between 60 and 120° C.;
(c) adding a plasticiser having a boiling point of at least 220° C. at 1 atm and optionally a chemical cross-linker to the solution of step (b);
(d) preparing a film layer of the solution of step (c);
(e) evaporating the alcoholic solvent from the film layer of step (d) to obtain a dried film layer; and
(f) chemically cross-linking the dried film layer of step (e) at a temperature between 50 and 250° C. to obtain the proton exchange membrane.

The glass transition temperature $T_g$ of polymers comprising 2,6-diphenyl-1,4-phenylene oxide repeating units such as for example poly(2,6-diphenyl-1,4-phenylene oxide) generally is above 200° C. The addition of sulfonic acid/sulfonate salt groups further increases the $T_g$. Hence, without addition of the plasticiser in step (c), the mobility of the polymer network is too low to enable sufficient curing.

In a preferred embodiment, the plasticiser having a boiling point of at least 220° C. at 1 atm is chosen from the group consisting of sulfolane, m-dinitrobenzene, ethyl-propylsulfone and combinations thereof.

In a preferred embodiment, the temperature in the cross-linking step (f) is between 100 and 225° C., even more preferably between 150 and 205° C. Examples of chemical cross-linkers that can be advantageously applied in the process are diphenyl ether, biphenols and biphenols reacted first with epichlorohydrin and subsequently with an amine such as diethylamine or diethanolamine. In a preferred embodiment, no chemical cross-linker is applied in step (c).

In another preferred embodiment, the alcoholic solvent having a boiling point at 1 atm of between 60 and 120° C. comprises one or more $C_1$-$C_4$ alcohols. Most preferably, the alcoholic solvent comprises methanol, ethanol, iso-propanol, or combinations thereof, optionally containing 5-20% of water.

In still another preferred embodiment the film layer of step (d), the dried film layer of step (e) and/or the proton exchange membrane obtained in step (f) have a thickness of between 10 and 500 μm, more preferably between 15 and 250 μm, even more preferably between 20 and 75 μm.

In a fifth aspect, the invention relates to the use of the polymer comprising sulfonated 2,6-diphenyl-1,4-phenylene oxide repeating units as defined hereinbefore or the polymer comprising sulfonated 2,6-diphenyl-1,4-phenylene oxide repeating units obtainable by the process as defined hereinbefore in a membrane electrode assembly, in a proton exchange membrane, in a fuel cell, in an electrolytic hydrogen compressor, in an electrolyser or in a flow battery.

In a sixth aspect, the invention relates to the use of the polymer comprising sulfonated 2,6-diphenyl-1,4-phenylene oxide repeating units as defined hereinbefore or the polymer comprising sulfonated 2,6-diphenyl-1,4-phenylene oxide repeating units obtainable by the process as defined hereinbefore in ion exchange materials.

Thus, the invention has been described by reference to certain embodiments discussed above. It will be recognized that these embodiments are susceptible to various modifications and alternative forms well known to those of skill in the art.

Furthermore, for a proper understanding of this document and its claims, it is to be understood that the verb 'to comprise' and its conjugations are used in its non-limiting sense to mean that items following the word are included, but items not specifically mentioned are not excluded. In addition, reference to an element by the indefinite article 'a' or 'an' does not exclude the possibility that more than one of the element is present, unless the context clearly requires that there be one and only one of the elements. The indefinite article 'a' or 'an' thus usually means 'at least one'.

EXAMPLES

Comparative Example 1: Synthesis of $SP_3O$ with High Degree of Sulfonation

About 15 g of $P_3O$ (poly(2,6-diphenyl-1,4-phenylene oxide)) with $M_v$ of about 350 000 g/mol, as measured using viscosimetry in accordance with P. J. Akers, G. Allen and M. J. Bethell, *Polymer*, 9, 1968, page 575, was dissolved in 60 mL 1,2-dichlorobenzene while being stirred vigorously. After complete dissolution of $P_3O$, 60 mL of nitrobenzene was added, and this mixture was added slowly to 142.5 mL of fuming sulfuric acid (20% $SO_3$) while being cooled on a water bath of 20° C. Despite this cooling, the temperature of the reaction mixture rose significantly. Subsequently, the mixture was stirred for 1 hour at 20° C. followed by precipitation in dry ether (6 L). The precipitate was allowed to settle, and the majority of the resulting supernatant was removed by decantation. The product was isolated by filtration (under an inert atmosphere of nitrogen gas), washed with ether, and dried in vacuo over $P_2O_5$, to yield sulfonated poly(2,6-diphenyl-1,4-phenylene oxide) ($SP_3O$) as off-white fibers. Titration of a sample using a 1 M NaOH solution demonstrated a degree of sulfonation (DS) of 2.24 $SO_3H$/(repeating unit). This degree of sulfonation corresponds to an equivalent weight (EW) of 188.9 g/(mol $SO_3H$).

It was found that solvent 1,2-dichlorobenzene was subjected to sulfonation. The sulfonated dichlorobenzene is highly soluble in diethyl ether. Solubility of the resulting hygroscopic polymer in water was high. Polymer films prepared from the polymer after thermal curing at up to 350° C. and exposed to water swelled excessively and had limited mechanical strength. It is concluded that polymers having a degree of sulfonation (DS) of 2.24 $SO_3H$/(repeating unit) or higher or an equivalent weight (EW) of 188.9 g/(mol $SO_3H$) or lower are not suitable for application in proton exchange membranes for fuel cells.

Comparative Example 2: Synthesis of $SP_3O$ with Low Degree of Sulfonation

About 10 g of $P_3O$ was dissolved in 150 mL of chloroform. Subsequently, 5.25 g (45 mmol) chlorosulfonic acid dissolved in 50 mL of nitromethane was added slowly at a temperature of 20° C. After addition, the mixture was stirred for an additional 8 hours at 20° C., followed by precipitation in 1.5 liter of dry ether. The precipitate was allowed to settle and the majority of the resulting supernatant was removed by decantation. The product was isolated by filtration (under an inert atmosphere), washed with ether, and dried in vacuo over $P_2O_5$ at 60° C., to yield the product as off-white fibers. Titration of a sample using a 1 M NaOH solution, gave a degree of sulfonation (DS) of 0.4 $SO_3H$/(repeating unit). This degree of sulfonation corresponds to an equivalent weight (EW) of 690.0 g/(mol $SO_3H$).

A film prepared from this polymer (curing unnecessary because the polymer is insoluble in water) showed a proton conductivity (95% RH, 80° C.) of below 25 mS/cm. It was concluded that at this low degree of sulfonation the polymer is unsuitable for application in proton exchange membranes for fuel cells.

It was found that sulfonation using higher amounts of chlorosulfonic acid leads to a pronounced danger of cross-linking of the polymer such that higher degrees of sulfonation cannot be realized when chlorosulfonic acid is used. This is illustrated in Comparative Example 3.

Comparative Example 3; Example 1 of U.S. Pat. No. 3,631,130

Comparative Example 3 precisely follows Example 1 of U.S. Pat. No. 3,631,130. A solution of 9.5 parts of chlorosulfonic acid (9.5 gram; 81.5 mmol; 2 moleq) in 95 parts of nitromethane (95 gram; 84.3 mL) was added to a stirred solution of 10 parts of poly-(2,6-diphenyl-1,4-phenylene ether (10 gram; 41 mmol of monomer units) dissolved in 150 parts of chloroform (100.5 mL). The reaction mixture was kept at a temperature of 25-30° C. using an oil bath. After the addition of about 60% of the chlorosulfonic acid solution was completed (40 minutes), the mixture started to gel. The addition of the chlorosulfonic acid solution was continued, resulting in a gel that was fragmented into lumps upon the continued stirring (60 minutes). After the addition of all chlorosulfonic acid was completed (80 minutes), the polymer product had precipitated completely from solution, giving purple-brown solid lumps in a clear liquid. The mixture was stirred for another 15 hours at a temperature of 25-30° C. A two-phase mixture was obtained consisting of an upper liquid phase and a solid lower phase of beige sticky lumps and chunks. The liquid phase was decanted from the mixture. It was tried to dissolve the polymer residue (beige sticky lumps and chunks) in methanol (150 mL), but this failed, as a yellow gel was obtained. Accordingly, a product was obtained that could not be processed into film by dissolution in methanol solvent.

Comparative Example 4: Example 1 of U.S. Pat. No. 3,631,130

Comparative Example 3 was repeated using the same procedure and quantities as described. However, after addition of the chlorosulfonic acid solution, the reaction mixture was not stirred for 15 hours at 25-30° C., but only for 1 hour at 25-30° C. The result was the same as found in experiment 1: the liquid phase was decanted from the reaction mixture, and the polymer residue product (beige sticky lumps and chunks) did not dissolve in methanol (150 mL), but gave a collection of yellow gel lumps in methanol. Accordingly, a product was obtained that could not be processed by molecular dissolution in methanol solvent.

Example 1: Synthesis of $SP_3O$ with DS=0.98

About 12.5 g $P_3O$ was dissolved in 125 ml of dichloromethane in a 3-neck 250 mL flask equipped with an overhead mechanical stirrer. After all polymer had dissolved, 30 ml sulfolane was added. Subsequently, 12.5 ml of oleum (20% $SO_3$, 60 mmol $SO_3$, 1.18 moleq) was added dropwise to the reaction mixture via an addition funnel. The reaction mixture started to gelate when about half of the oleum had been added. However, the gel fragmented into smaller lumps upon continued addition of oleum and stirring. After the addition was complete, the dichloromethane was evaporated under a $N_2$-flow that was passed over the reaction mixture to give a very viscous brown paste. This paste was dissolved in 100 ml of MeOH and the resulting solution was precipitated into MeCN (1 liter), giving a pudding-like jelly ball. Removing residual solvent by squeezing the ball, was followed by fragmenting the ball-like precipitate manually. Redissolving the solid residue in 100 ml of MeOH and precipitating the dissolved solid a second time into MeCN (1 liter) gave sticky white/yellow fibers that formed a lump. Fragmenting the lump manually, and drying at 40° C. overnight gave the $SP_3O$ product. Titrating 100.6 mg of the product with 3.00 ml of a 101.8 mM NaOH solution showed that the $SP_3O$ material had a degree of sulfonation (DS) of 0.98 $SO_3H$/(repeating unit). This degree of sulfonation corresponds to an equivalent weight (EW) of 329.0 g/(mol $SO_3H$).

Example 2: Synthesis of $SP_3O$ with DS=1.24

About 10 g of $P_3O$ was dissolved in 100 ml of dichloromethane in a 3-neck 250 mL flask equipped with an overhead mechanical stirrer. When all polymer was dissolved, 30 ml of sulfolane was added. The mixture was cooled on a water bath. Using an addition funnel, 15 ml of oleum (20% $SO_3$, 72 mmol, 1.76 moleq) was added dropwise to the $P_3O$ solution over a period of an hour. The reaction mixture started to gelate when about one third of the oleum had been added. However, the formed gel fragmented into smaller lumps upon continuation of addition of the oleum and upon continued stirring. During addition of the oleum, the temperature of the cooling water bath rose from about 15° C. to about 25° C., and accordingly the sulfonation reaction was found to be exothermal. After the addition of oleum was complete, stirring was continued for another 15 minutes. Then, dichloromethane was evaporated under a $N_2$-flow that was passed over the reaction mixture, causing the temperature of the cooling water bath to drop to about 10° C. The reaction mixture turned into a very viscous brown paste. This paste was diluted and dissolved in approximately 75 mL of MeOH. The resulting solution was precipitated into MeCN (1 liter), giving a pudding-like jelly ball. Removing residual solvent by squeezing the ball, was followed by fragmenting the ball-like precipitate manually. Redissolving the solid residue in 75 ml of MeOH and precipitating the solution for a second time in MeCN (1 liter) gave white/yellowish fibers. Drying of the fibers at 40° C. overnight gave the $sP_3O$ product. Titrating 103.2 mg of the product with 3.65 ml of a 101.8 mM NaOH solution showed that the $SP_3O$ product had a degree of sulfonation (DS) of 1.24 $SO_3H$/(repeating unit). This degree of sulfonation corresponds to an equivalent weight (EW) of 276.8 g/(mol $SO_3H$).

Example 3: Synthesis of SP₃O with DS=1.40

About 30 g of P₃O was dissolved in 300 ml of dichloromethane in a 3-neck 1L flask equipped with an overhead mechanical stirrer. When all polymer had dissolved, 90 ml of sulfolane was added. The mixture was cooled on a water bath. Using an addition funnel, 52.4 ml of oleum (20% SO₃, 252 mmol, 2.05 moleq) was added dropwise to the reaction mixture. The addition was done in a period of about an hour. The reaction mixture started to gelate when about one third of the oleum had been added. However, the gel fragmented into smaller lumps upon continued addition of oleum and upon continued stirring. After the addition of oleum was complete, stirring was continued for another 15 minutes. Dichloromethane was then evaporated under a N₂-flow that was passed over the reaction mixture, causing the temperature of the cooling water bath to drop to about 10° C. The reaction mixture turned into a very viscous brown paste. This paste was dissolved in 250 ml of MeOH and was precipitated into 2.5 liter of MeCN, giving a jelly pudding-like ball. Removing residual solvent by squeezing the ball, was followed by fragmenting the ball-like precipitate manually. The solid residue was redissolved in 250 ml of MeOH using an overhead mechanical stirrer. The MeOH solution was precipitated once more into 2.5 liter of MeCN to give sticky white/yellow fibers that formed a lump. The lump was disintegrated manually and was transferred to another beaker with fresh MeCN and was left to stand for several hours. The MeCN was decanted and the residue dried at 40° C. overnight giving the SP₃O product. Titrating the product with a NaOH solution showed that the SP₃O product had a degree of sulfonation (DS) of 1.40 SO₃H/(repeating unit), corresponding to an equivalent weight (EW) of 254.3 g/(mol SO₃H).

Example 4

A film was prepared by casting a mixture of a solution consisting of 1.48 g of SP₃O with DS=1.35, prepared analogously to the procedure described in Example 3, 0.49 g of plasticizer (sulfolane) and 8.03 g of 85 wt. % aqueous ethanol with a 320 μm doctor blade on a polytetrafluoroethylene substrate, followed by allowing the volatiles to evaporate at room temperature during about 1 h. The solidified product was cured at 200° C. for 1 h.

The film was subjected to proton conductivity measurements. The measurements were conducted in a Fumatech MK3 proton conductivity instrument coupled with a Gamry Reference 600 potentiostat/galvanostat ZRA. The film according to the present invention was also compared with a Nafion® membrane type 211), both at a relative humidity of 95% and at 80° C.:
Nafion 211: 95 mS/cm
SP₃O with DS=1.35: 350 mS/cm

Example 5

A sample of the film of Example 4 was built into a membrane-electrode-assembly (MEA) using carbon cloth electrodes furnished with 0.1 mg of Pt catalyst per cm² applied via an ink containing 50 Pt-on-C catalyst particles and 0.06 g of polymer per g of catalyst. This MEA was tested in a fuel cell type test cell at 95% RH in hydrogen pumping mode, at room temperature, 10 bar feed side and variable high pressure delivery side. A current density (representing hydrogen transported) of 9 A/cm² was recorded at 500 mV.

The new MEA type was tested for 800 h (65° C., 1 A/cm², 95% RH, 0.15 V) in a fuel cell test cell arrangement in hydrogen pumping mode without significant performance decay; no degradation was observed while employing such a MEA in an electrolytical hydrogen compressor to generate a pressure of 800 bar when fed with hydrogen at 1 bar, 65° C., 95% RH.

The invention claimed is:

1. Polymer comprising sulfonated 2,6-diphenyl-1,4-phenylene oxide repeating units in accordance with Formula (Ia):

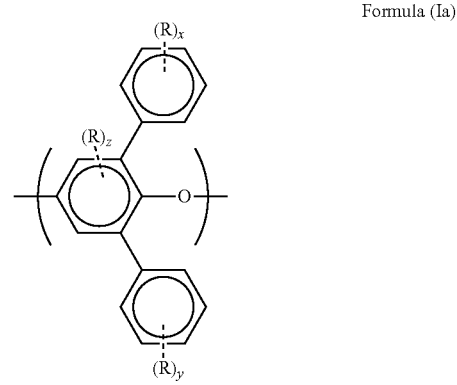

Formula (Ia)

wherein group R represents sulfonic acid (—SO₃H), sulfonate salt (—SO₃⁻X⁺), wherein X⁺ is a cation, or combinations thereof, wherein x, y and z are integer values, independently chosen from 0, 1 and 2;

wherein the equivalent weight, defined as the number of grams of dry sulfonated polymer per mol of group R, is between 215 and 405 g/(mol R), and wherein the polymer is (i) a homopolymer consisting of the repeating units in accordance with Formula (Ia) or (ii) wherein the polymer is a random copolymer, blockcopolymer, grafted polymer or branched polymer, comprising in addition to the sulfonated 2,6-diphenyl-1,4-phenylene oxide repeating units in accordance with Formula (Ia) further repeating units chosen from the group consisting of other types of 2,6-disubstituted-1,4-phenylene oxides, wherein the ratio of the number of repeating units in accordance with Formula (Ia) to the further repeating units is between 99:1 and 20:80.

2. The polymer according to claim 1, wherein the equivalent weight is between 225 and 330 g/(mol R).

3. The polymer according to claim 1, wherein the viscosity average molecular weight $M_v$ of the polymer comprising 2,6-diphenyl-1,4-phenylene oxide repeating units, before sulfonation or without sulfonic acid/sulfonate groups, as measured using viscosimetry, is between 10,000 and 500,000 g/mol.

4. Process for the preparation of polymer comprising sulfonated 2,6-diphenyl-1,4-phenylene oxide repeating units according to claim 1, wherein the process comprises the steps of:

(i) providing a polymer comprising 2,6-diphenyl-1,4-phenylene oxide repeating units in accordance with Formula (II):

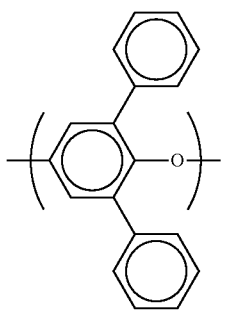

Formula (II)

(ii) dissolving the polymer of step (i) in a first solvent;
(iii) adding a second solvent to the solution of step (ii), said second solvent being miscible with the first solvent when used in an amount of between 10 to 60% with respect to the volume of the first solvent and having a higher polarity than the first solvent;
(iv) subjecting the dissolved polymer of step (iii) to sulfonation by adding oleum;
(v) adding a third solvent to the solution of step (iv) causing precipitation of the polymer comprising sulfonated 2,6-diphenyl-1,4-phenylene oxide repeating units; and
(vi) separating the polymer comprising sulfonated 2,6-diphenyl-1,4-phenylene oxide repeating units from the reaction mixture of step (v).

5. The process according to claim 4, comprising the steps of:
(i) providing a polymer comprising 2,6-diphenyl-1,4-phenylene oxide repeating units in accordance with Formula (II):

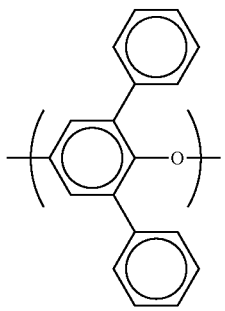

Formula (II)

(ii) dissolving the polymer of step (i) in a first solvent having a boiling point at 1 atm of between 30 and 120° C.;
(iii) adding a second solvent to the solution of step (ii), said second solvent being miscible with the first solvent when used in an amount of between 10 to 60% with respect to the volume of the first solvent, having a higher polarity than the first solvent and having a boiling point of between 125 and 350° C. at 1 atm;
(iv) subjecting the dissolved polymer of step (iii) to sulfonation by adding oleum, removing the first solvent from the reaction mixture through evaporation to obtain a viscous mass, and dissolving the viscous mass in a $C_1$-$C_4$ alcohol;
(v) adding a third solvent to the solution of step (iv) causing precipitation of the polymer comprising sulfonated 2,6-diphenyl-1,4-phenylene oxide repeating units; and
(vi) separating the polymer comprising sulfonated 2,6-diphenyl-1,4-phenylene oxide repeating units from the reaction mixture of step (v).

6. The process according to claim 4, wherein the first solvent is chosen from the group consisting of 1,2-dichlorobenzene, dichloromethane, chloroform, methylchloroform, ethylene chloride and mixtures thereof.

7. The process according to claim 4, wherein the second solvent is chosen from the group consisting of sulfolane, nitrobenzene and ethyl-propylsulfone.

8. The process according to claim 4, wherein the third solvent is chosen from the group consisting of diethyl ether, acetonitrile and ethyl acetate.

9. The process according to claim 4, wherein the first solvent is chosen from the group consisting of dichloromethane and 1,2-dichloroethane, the second solvent is chosen from the group consisting of sulfolane and nitrobenzene and the third solvent is diethyl ether.

10. The process according to claim 4, wherein the first solvent is dichloromethane, the second solvent is sulfolane and the third solvent is diethyl ether.

11. The process according to claim 4, wherein the first solvent is dichloromethane, the second solvent is sulfolane and the third solvent is acetonitrile.

12. The process according to claim 4, wherein the viscosity average molecular weight Mv of the polymer comprising 2,6-diphenyl-1,4-phenylene oxide repeating units in accordance with Formula (II), as measured using viscosimetry, is between 10,000 and 500,000 g/mol.

13. Proton exchange membrane comprising the polymer comprising sulfonated 2,6-diphenyl-1,4-phenylene oxide repeating units according to claim 1 or the polymer comprising sulfonated 2,6-diphenyl-1,4-phenylene oxide repeating units obtainable by a process comprising the steps of:
(i) providing a polymer comprising 2,6-diphenyl-1,4-phenylene oxide repeating units in accordance with Formula (II):

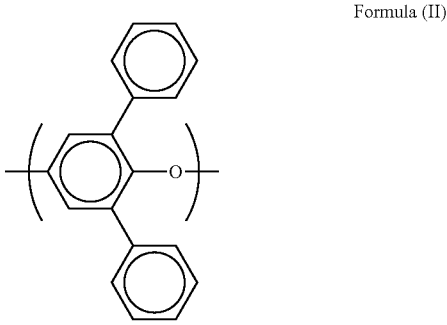

Formula (II)

(ii) dissolving the polymer of step (i) in a first solvent;
(iii) adding a second solvent to the solution of step (ii), said second solvent being miscible with the first solvent when used in an amount of between 10 to 60% with respect to the volume of the first solvent and having a higher polarity than the first solvent;
(iv) subjecting the dissolved polymer of step (iii) to sulfonation by adding oleum;
(v) adding a third solvent to the solution of step (iv) causing precipitation of the polymer comprising sulfonated 2,6-diphenyl-1,4-phenylene oxide repeating units; and (vi) separating the polymer comprising sulfonated 2,6-diphenyl-1,4-phenylene oxide repeating units from the reaction mixture of step (v).

14. Process for the preparation of a proton exchange membrane comprising the steps of:
(a) providing the polymer comprising sulfonated 2,6-diphenyl-1,4-phenylene oxide repeating units according to claim 1 or the polymer comprising sulfonated 2,6-diphenyl-1,4-phenylene oxide repeating units obtainable by a process comprising the steps of:
(i) providing a polymer comprising 2,6-diphenyl-1,4-phenylene oxide repeating units in accordance with Formula (II):

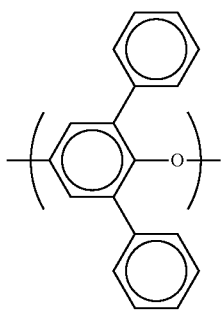

Formula (II)

(ii) dissolving the polymer of step (i) in a first solvent;
(iii) adding a second solvent to the solution of step (ii), said second solvent being miscible with the first solvent when used in an amount of between 10 to 60% with respect to the volume of the first solvent and having a higher polarity than the first solvent;
(iv) subjecting the dissolved polymer of step (iii) to sulfonation by adding oleum;
(v) adding a third solvent to the solution of step (iv) causing precipitation of the polymer comprising sulfonated 2,6-diphenyl-1,4-phenylene oxide repeating units; and
(vi) separating the polymer comprising sulfonated 2,6-diphenyl-1,4-phenylene oxide repeating units from the reaction mixture of step (v),
(b) dissolving the polymer of step (a) in an alcoholic solvent having a boiling point at 1 atm of between 60 and 120° C.;
(c) adding a plasticiser having a boiling point of at least 220° C. at 1 atm and optionally a chemical cross-linker to the solution of step (b);
(d) preparing a film layer of the solution of step (c); evaporating the alcoholic solvent from the film layer of step (d) to obtain a dried film layer; and
(e) chemically cross-linking the dried film layer of step (e) at a temperature between 50 and 250° C. to obtain the proton exchange membrane.

15. The polymer according to claim 1, wherein the equivalent weight is between 240 and 270 g/(mol R).

* * * * *